W. V. TURNER.
ELECTROPNEUMATIC BRAKE.
APPLICATION FILED MAR. 29, 1917.
1,297,422.
Patented Mar. 18, 1919.
2 SHEETS—SHEET 1.
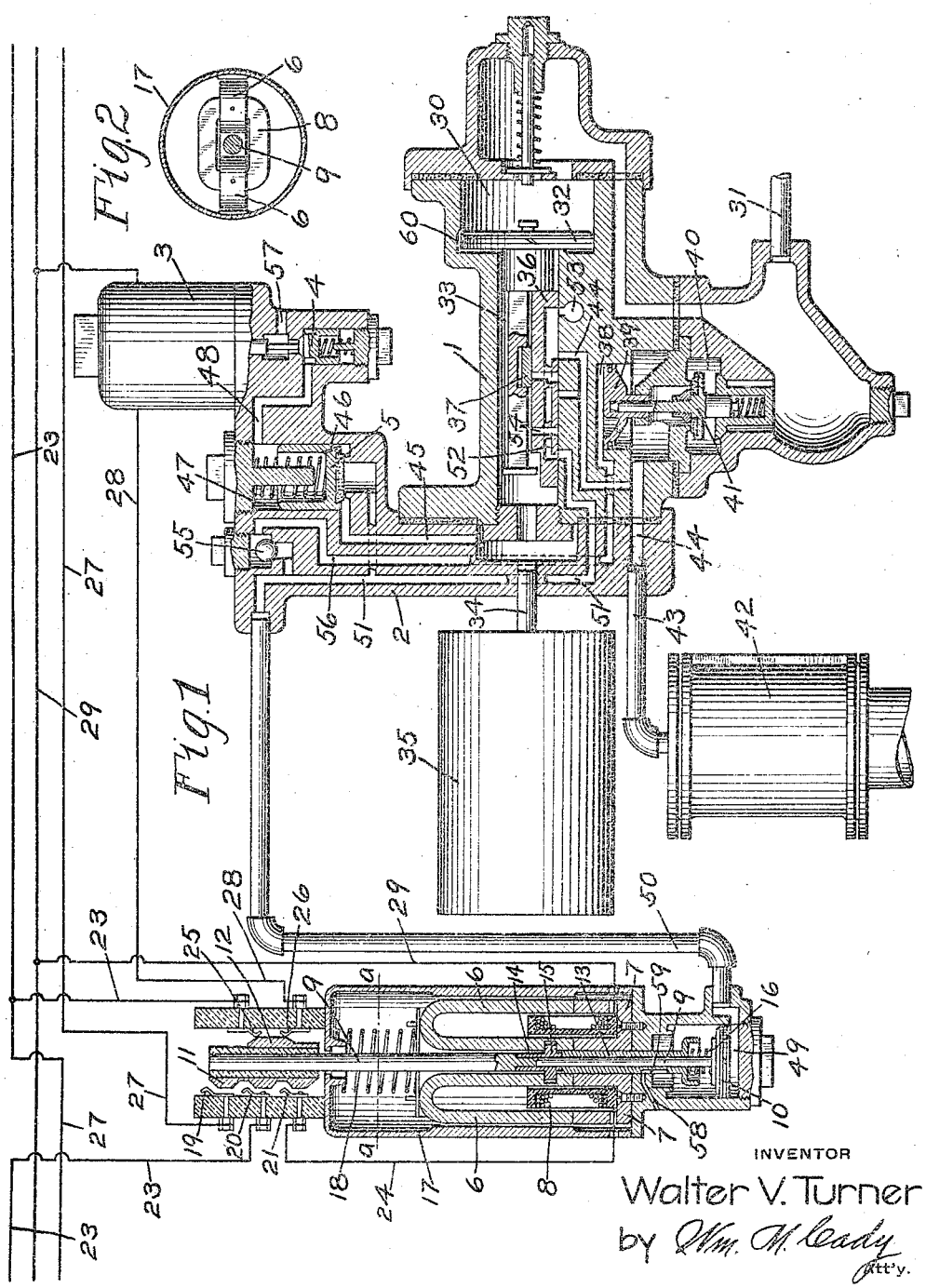
INVENTOR
Walter V. Turner
by Wm. M. Cady
Att'y.

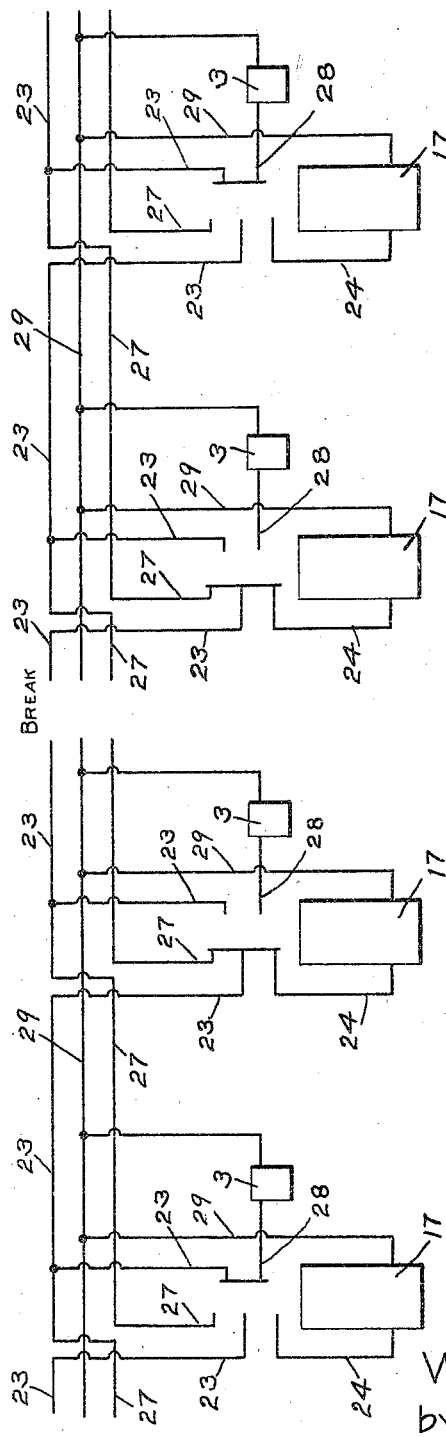

UNITED STATES PATENT OFFICE.

WALTER V. TURNER, OF WILKINSBURG, PENNSYLVANIA, ASSIGNOR TO THE WESTINGHOUSE AIR BRAKE COMPANY, OF WILMERDING, PENNSYLVANIA, A CORPORATION OF PENNSYLVANIA.

ELECTROPNEUMATIC BRAKE.

1,297,422.  Specification of Letters Patent.  Patented Mar. 18, 1919.

Application filed March 29, 1917. Serial No. 158,185.

*To all whom it may concern:*

Be it known that I, WALTER V. TURNER, a citizen of the United States, residing at Wilkinsburg, in the county of Allegheny and State of Pennsylvania, have invented new and useful Improvements in Electropneumatic Brakes, of which the following is a specification.

This invention relates to electro-pneumatic brakes, and more particularly to a brake of this character, in which fluid is electrically vented from the brake pipe to effect quck action throughout the train.

It has heretofore been proposed to provide equipments of the above character, but the practical application of such apparatus has presented certain difficulties.

If electric power is obtained from the locomotive, then a source of current must be provided such as a battery, an axle or steam driven generator, or the like, and in addition to the cost of maintenance and installation, there would be the danger of such a drop in voltage on a long train that the magnets at the rear of the train might not be operated, unless heavy conductors are employed in connection with the use of a large current.

If the train circuit is normally open, then electrical transmission of quick action would not be obtained in case of a train break-in-two. On the other hand, if the train circuit is normally closed, there will be a constant waste of current while the train is running, as well as the danger of burnt contacts through the continual flow of current.

In case of a broken wire, current can not be transmitted beyond the car where the break occurs.

Another method is to provide a generator on each car of the train, in which case many of the disadvantages above referred to may be obviated. However, the same objection as to the first cost and maintenance would apply, if storage batteries or axle driven generators are employed.

One object of my invention is to provide an electric generator particularly adapted for this service and which can be cheaply manufactured and will not be expensive to maintain.

Another object of my invention is to provide a generator operated by fluid under pressure from the brake system for generating electric current to effect the transmission of braking action throughout the train.

So far as the use of the improved generator is concerned, the same may be employed with ordinary continuous train conductors, but there would then exist the same objection as when the source of current is located on the locomotive; that is to say, the generator would have to be large enough to supply current through a long train.

Another object of my invention is to provide an electric brake system which will permit the use of a small generator on each car and to accomplish this purpose I propose to restrict the field of operation of each generator to a local circuit, the generation of current in one local circuit being adapted to effect the generation of current in a succeeding local circuit and so on serially throughout the train.

In the accompanying drawings; Figure 1 is a sectional view of an electro-pneumatic car brake equipment embodying my invention; Fig. 2 a section on the line *a—a* of Fig. 1; and Fig. 3 a wiring diagram of the circuits for four cars.

According to a preferred form of my invention as shown in Fig. 1 of the drawings, a triple valve device 1 may be provided, and secured to the rear bolting flange of the triple valve device is a bracket 2 having a magnet 3 for operating a valve 4 and a relay valve 5 adapted to be controlled by the valve 4.

The electric generator may comprise a pair of permanent horse shoe magnets 6 having armatures 7 and a coil 8, inclosing the inner legs of the magnets 6 and the armatures 7.

Intermediate the magnets 6 is a piston rod 9 having a piston 10 at one end and provided at the opposite end with contacts 11 and 12, and at the piston end of the piston rod 9, a movable sleeve 13 surrounds the rod and is adapted to engage a sleeve 14 having a collar 15 which is mounted within recesses formed in the inner legs of the magnets 6. Between the sleeve 13 and piston 10 is a light spring 16 and between the magnets 6 and the magnet inclosing casing 17 is a spring 18.

The contact 11 is adapted upon movement to connect fingers 19, 20, and 21, the contact fingers 19 and 20 being connected respectively to train wires 27, 23, and the contact finger 21 to a wire 24 which is connected to one terminal of coil 8, and contact 12 is adapted to normally connect fingers 25 and 26 leading respectively to train wire 23 and wire 28, the wire 28 being connected to one terminal of magnet 3, the other terminals of the magnet 3 and the coil 8 being connected to a train wire 29.

The triple valve device 1 comprises the usual casing having a piston chamber 30 connected to brake pipe 31 and containing piston 32, and valve chamber 33 connected by pipe 34 to auxiliary reservoir 35 and containing a main slide valve 36 and a graduating slide valve 37 mounted on and having a movement relative to the main slide valve.

The triple valve casing also has a quick action piston chamber 38 containing piston 39 and a valve chamber 40 containing vent valve 41 adapted to be operated by piston 39. A brake cylinder 42 is connected by pipe 43 to a passage 44 leading to the seat of slide valve 36 and to the chamber at the outer face of piston 39.

In operation, fluid supplied to the brake pipe 31, in the usual manner, flows to piston chamber 30 of the triple valve device 1 and thence through feed groove 60 to valve chamber 33 and auxiliary reservoir 35. Fluid is also supplied from valve chamber 33 through passage 45 to the outer seated area of the relay valve 5 and thence through a restricted port 46 to chamber 47 which is connected by passage 48 to valve 4.

In the release position of the triple valve parts, piston chamber 49 containing piston 10 is connected to the atmosphere through pipe 50, passage 51, and cavity 52 in main slide valve 36, to exhaust port 53.

If an emergency reduction in brake pipe pressure is effected by manipulation of the usual brake valve, the reduction will be first effective on the head car of the train to cause the movement of the triple valve to emergency position.

The consequent movement of the main slide valve 36 causes port 54 therein to register with a branch port of passage 44, so that fluid is supplied from the auxiliary reservoir to the brake cylinder. Passage 51 is also uncovered by the movement of the main slide valve and fluid under pressure is supplied through passage 51, past check valve 55, to a passage 56 leading to quick action piston chamber 38, so that said piston is operated to open the vent valve 41 to effect the usual local emergency reduction in brake pipe pressure.

Fluid under pressure also flows from passage 51 through pipe 50 to piston chamber 49 and operates piston 10 to first move piston stem 9 and shift the contacts 11 and 12. The fingers 25 and 26 are thus electrically disconnected and thereby the circuit of the local magnet 3 is opened, so that unnecessary use of current to energize the magnet 3 is prevented, since on the car when the emergency action is initiated, the operation is effected pneumatically and does not require the operation of the magnet 3.

The movement of contact 11 connects the fingers 19, 20, and 21, so that one terminal of the coil 8 is connected to train wires 23 and 27.

Upon further movement of piston 10, the same engages the sleeve 13 and shifts the same to actuate sleeve 14 and thereby move the magnets 6 away from the armatures 7. By the well known electro-magnetic principle, the movement of the magnets 6 with respect to the coil 8 induces a flow of current in the coil, which is transmitted through the wire 24 and train wire 23 to finger 25 of the switch device on the car immediately at the rear of the car on which the generator is operated. The switch on this car being in normal position, the contact 12 connects finger 25 with finger 26, so that current is supplied through wire 28 to magnet 3, the other terminal of the magnet being connected through wire 29 to the other terminal of the coil 8 so as to form a closed circuit.

The magnet 3 on this car is then energized to open the pilot valve 4 and vent fluid from chamber 47 through passage 48 to exhaust port 57. Auxiliary reservoir pressure acting on the exposed area of the opposite side of the relay valve 5 then forces the valve from its seat and fluid is supplied from the auxiliary reservoir through passage 45 to passage 51 and thence past check valve 55 to passage 56, so that fluid is supplied to quick action piston 39 to cause quick action on this car by the operation of the magnet 3.

Fluid is also supplied from passage 51 through pipe 50 to piston chamber 49 so as to operate piston 10 to effect the generation of current on this car which in turn is transmitted to the next car immediately at the rear in the same manner as previously described.

In this way, emergency action is electrically transmitted through the train, so that a more nearly simultaneous application of the brakes throughout the train is obtained, than would be the case when the action is transmitted pneumatically.

The piston 10 does not rest in the position closing the connections between the contact 11 and the fingers 19, 20, and 21, but continues its upward movement, so as to again open the circuits.

When the brake pipe pressure is increased to effect the release of the brakes, the triple valve piston is returned to release position, and the passage 51 is connected to exhaust port 53 through cavity 52, so that fluid is vented from piston chamber 49, permitting the springs 16 and 18 to return the movable parts of the generator to normal position.

If emergency action be initiated by a break-in-two of the train, fluid is vented from the brake pipe at the point of separation, and the sudden reduction in brake pipe pressure acting on the triple valve of the first car of the rear section, causes the electrical transmission of quick action rearwardly, as in the case of manipulating the brake valve, hereinbefore described.

On the front section, the triple valve on the car nearest the break is operated by the sudden reduction in brake pipe pressure and on this car the generator is operated by the admission of fluid under pressure to piston 10 as hereinbefore described.

In this case, however, the electrical circuits are so arranged, as shown in Fig. 3 of the drawings, that the magnet 3 of the car just ahead of the car where the emergency action is initiated, is energized, the flow of current in this case being from the coil 8 through wire 24, contact 11 to wire 27, and thence through wire 23, finger 25, contact 12 and finger 26 to wire 28, and through magnet 3 to wire 29, to the other terminal of the coil 8.

In order to maintain the chamber above piston 10 at atmospheric pressure and prevent the formation of an air cushion which would tend to retard the movement of the piston, an exhaust port 58 may be provided, which is adapted to be connected to said chamber by groove 59 in the sleeve.

It will thus be seen that electrical transmission takes place both toward the rear and the front when a break-in-two occurs at any point in the train.

By reason of the above described construction, the generator may be relatively small since it only has to supply current for operating magnets on the immediately adjacent car.

Having now described my invention, what I claim as new and desire to secure by Letters Patent, is:—

1. In an electro-pneumatic brake, the combination with an electric generator and means actuated by fluid under pressure for operating said generator, of a valve device for effecting an application of the brakes and adapted to supply fluid under pressure to said means upon applying the brakes and means operated by current from said generator for effecting the operation of said valve device.

2. In an electro-pneumatic brake, the combination with a fluid pressure brake system, of an electric generator operated by fluid pressure from the brake system in applying the brakes for generating current, and means operated by current from the generator for effecting the electric transmission of the braking action throughout the train.

3. In an electro-pneumatic brake, the combination with a brake pipe, of an electric generator operated by fluid under pressure, means operated upon a reduction in brake pipe pressure for supplying fluid under pressure to said electric generator, and means operated by current from said generator for effecting a serial reduction in brake pipe pressure throughout the train.

4. In an electro-pneumatic brake, the combination with a brake pipe, a variation in pressure in which is adapted to effect an application of the brakes, of a magnet for effecting a variation in pressure in the brake pipe and an electric generator in circuit with said magnet and operated upon a variation in fluid pressure in the brake pipe on one car for generating current to operate the magnet on another car.

5. In an electro-pneumatic brake, the combination with a brake pipe and a valve device operated upon a reduction in brake pipe pressure for effecting an application of the brakes, of a magnet valve for effecting a reduction in brake pipe pressure and an electric generator operated upon a reduction in brake pipe pressure for generating current to energize said magnet.

6. In an electro-pneumatic brake, the combination with a brake pipe and a valve device operated upon a reduction in brake pipe pressure for effecting an application of the brakes, of a magnet valve for effecting a reduction in brake pipe pressure and an electric generator on one car operated upon a reduction in brake pipe pressure for generating current to energize the magnet on an adjacent car.

7. In an electro-pneumatic brake, the combination with a fluid pressure brake system, of a permanent magnet generator, means operated by fluid under pressure from the brake system for operating said generator, and means operated by current from the generator for controlling the operation of said brake system.

8. In an electro-pneumatic brake, the combination with a fluid pressure brake system, of a permanent magnet generator operated by fluid under pressure from the brake system for generating current, and means operated by current from said generator for controlling the operation of said brake system.

9. In an electro-pneumatic brake, the combination with a fluid pressure brake system, of an electric generator for generating current, comprising a permanent magnet, a coil, and a piston operated by fluid under pressure for actuating said magnet to generate current in said coil, and means operated by current from said generator for varying the fluid pressure in said brake system.

10. In an electro-pneumatic brake, the combination with a brake pipe and a quick action valve mechanism for effecting a local reduction in brake pipe pressure, of a magnet controlled valve for effecting the operation of said quick action valve mechanism and an electric generator operated upon a reduction in brake pipe pressure for generating current to energize said magnet.

11. In an electro-pneumatic brake, the combination with a brake pipe, a valve device operated upon a sudden reduction in brake pipe pressure for effecting an emergency application of the brakes, and a quick action valve mechanism for effecting a local reduction in brake pipe pressure, of a valve for varying the pressure on said quick action valve mechanism, a magnet for operating said valve, and an electric generator operated by fluid supplied upon movement of said valve device to emergency position for generating current to energize a similar magnet on an adjacent car.

12. In an electro-pneumatic brake, the combination with a fluid pressure brake system, of electrically controlled means for effecting the transmission of braking action and an electric generator for generating current to energize said means, comprising a magnet, a coil in a circuit with said means, a switch for controlling said circuit, and a piston operated by fluid under pressure for first operating said switch and for then operating said magnet to effect the generation of current in said coil.

13. In an electro-pneumatic brake, the combination with a fluid pressure brake system, of electrically controlled means for effecting the transmission of braking action, an electric generator for generating current to energize said means, and a switch operated by said generator for opening the circuit to said means on the car when the generator is operated.

14. In an electro-pneumatic brake, the combination with a fluid pressure brake system, of electrically controlled means for effecting the transmission of braking action, an electric generator for generating current to energize said means, and a switch operated by said generator for opening the circuit to said means on the car when the generator is operated and for closing the circuit to said means on the adjacent car.

15. In an electro-pneumatic brake, the combination with a fluid pressure brake system, of electrically controlled means for effecting the transmission of braking action, an electric generator for generating current to energize said means, and a switch operated by said generator for closing a local circuit to said means on the adjoining rear car and a local circuit to said means on the adjoining forward car.

16. In an electro-pneumatic brake, the combination with a fluid pressure brake system, of electrically controlled means for effecting the transmission of braking action, an electric generator for generating current to energize said means, and a switch operated by said generator for opening the circuit to said means on the car when the generator is operated and for closing a local circuit to said means on the next rear car and a local circuit to said means on the next forward car.

In testimony whereof I have hereunto set my hand.

WALTER V. TURNER.

Copies of this patent may be obtained for five cents each, by addressing the "Commissioner of Patents, Washington, D. C."